UNITED STATES PATENT OFFICE 2,554,269

PROCESS FOR MAKING 2,2-BIS ARYL TRIHALOETHANES

Walter H. C. Rueggeberg and Willard E. Catlin, United States Army, and Walter A. Cook, Akron, Ohio, assignors to the United States of America as represented by the Secretary of War No Drawing. Application March 27, 1945, Serial No. 585,200

14 Claims. (Cl. 260—649)

The invention described herein may be manufactured and used by or for the Government for governmental purposes without the payment to us of any royalty thereon.

This invention relates, generally, to condensation type reactions wherein alkyl aryls are produced by the aid of halosulfonic acids. The invention relates, particularly, to new and improved methods of producing the pesticide popularly known as DDT, the chemical name of which is 2,2-bis (p-chlorophenyl) 1,1,1-trichloroethane.

DDT has been found to be an excellent insecticide and has been widely used by the military forces in jungle theatres and in the tropics. Its peacetime possibilities have been discussed in a number of current magazine articles. To date, the production of DDT has depended upon the employment of large volumes of 93% $H_2SO_4$ in order to effect the condensation between anhydrous chloral ($CCl_3CHO$) and chlorbenzene ($C_6H_5Cl$). The chemical literature contains several references to condensations of this type wherein some aryl compound is condensed with an aldehyde to form 1,1 diarylethanes. For example, Baeyer (Ber. 7, 1190 (1873)) succeeded in condensing acetaldehyde ($CH_3CHO$) with benzene to form 1,1 diphenylethane, using, however, 600 grams of concentrated $H_2SO_4$ for every 0.06 mol of paraldehyde (($CH_3CHO$)$_3$). This type of condensation conducted in the presence of a large excess of concentrated $H_2SO_4$ is still being conducted today, specifically in the synthesis of DDT.

The object of this invention, generally stated, is the provision of an improved method of condensing an alkyl compound with an aryl compound by the employment of a halosulfonic acid.

More specifically, an important object of the invention is the provision of a new and improved method of condensing an aliphatic alcohol or alcoholate with an aromatic hydrocarbon through the aid of a halosulfonic acid. Another important object of the invention is the provision of an improved method of carrying out condensation type reactions between aryl compounds and aldehydes by the aid of a halosulfonic acid.

Still another important object of our invention is the provision of a new and improved method of producing DDT involving the use of a halosulfonic acid to bring about the condensation between chlorbenzene and chloral, chloral hydrate, or chloral alcoholate. This method of making DDT is considerably more efficient and cheaper than present methods of making this compound. The superiority of this new method is, in a large measure, due to the feasibility of using chloral hydrate or chloral alcoholate in place of anhydrous chloral, and to the elimination of the use of the large volume of concentrated sulfuric acid heretofore required, and the utilization of small quantities of a halosulfonic acid instead.

Other objects of our invention will, in part, be obvious, and will in part appear hereinafter.

For a more complete understanding of the nature and scope of this invention, reference may be had to the following detailed description thereof, wherein a number of presently preferred methods of practicing the invention are fully described.

Numerous experiments have led to the conclusion that the role played by $H_2SO_4$ in the DDT synthesis is one of specific catalysis rather than one of simple dehydration. The mechanism for the action of $H_2SO_4$ appears to be as follows:

(1) 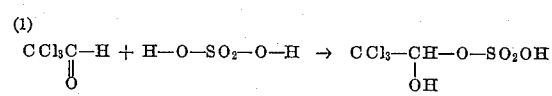

(2) 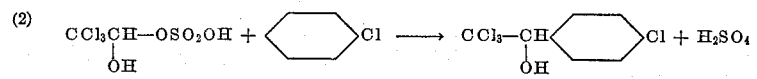

(3) 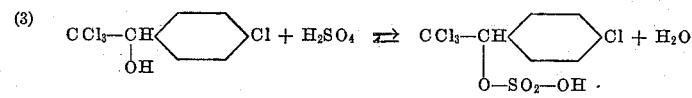

(4) 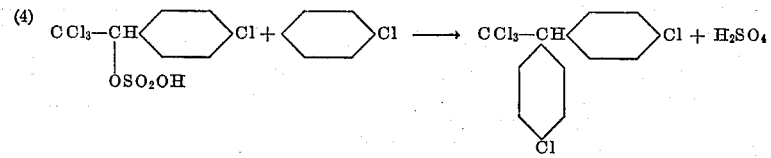

Reaction 3, above, for two reasons, is believed to be responsible for the necessity of using large quantities of concentrated $H_2SO_4$. First, a huge excess of concentrated $H_2SO_4$ nullifies the dilution effect of the acid by the water formed and second, the reversibility of equation 3 is minimized by the removal of $H_2O$ through a large excess of concentrated $H_2SO_4$.

These difficulties have been overcome by the use of a halosulfonic acid (for example, chlorsulfonic acid or fluosulfonic acid, both being commercially available products) as condensing agent for chloral hydrate and chlorbenzene to form DDT. An added advantage in the use of a halosulfonic acid is the fact that chloral hydrate ($CCl_3$—$CH(OH)_2$, a commercial product) may be used as reagent in place of chloral, which is less stable and less satisfactorily stored and shipped than is the hydrate or alcoholate and which would have to be prepared separately from chloral hydrate by the required quantity of concentrated $H_2SO_4$ in excess of that required for the $H_2SO_4$ in the DDT condensation, described above.

The action of a halosulfonic acid is described in the following set of equations, wherein X designates a halogen:

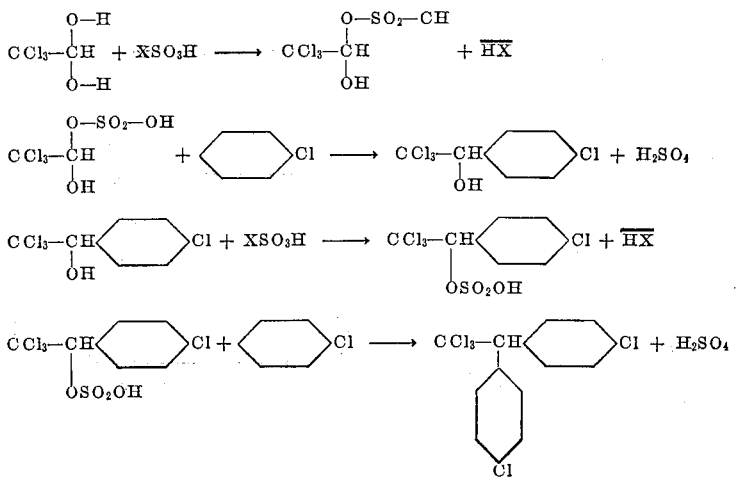

As exemplified by these reactions, the quantities of acid used are metathetical, there is no elimination of water, as such, and the reaction proceeds by the evolution of gaseous hydrogen halide and the formation of anhydrous $H_2SO_4$.

A presently preferred method of carrying out the invention in the production of DDT is as follows:

EXAMPLE 1

82.7 parts by weight of chloral hydrate are placed in a suitable reaction vessel provided with thermometer, stirrer, dropping funnel, and gas outlet tube. From the dropping funnel, 58.3 parts by weight of commercial chlorsulfonic acid are added slowly, keeping the temperature between 0° C. and 10° C. and avoiding a too violent evolution of HCl gas. After the addition of chlorsulfonic acid is complete, the mixture is allowed to stir at 10–20° C. until all of the chloral hydrate crystals have dissolved. 112.6 parts by weight of chlorbenzene are added to the reaction vessel at a rate slow enough so the reaction mixture remains at 20° C. This addition requires about 5–10 minutes. An additional 58.3 parts by weight of chlorsulfonic acid are then added dropwise from the dropping funnel over a period of approximately 2 hours, at which time a heavy precipitation of the DDT has become visible. Stirring is continued for an additional 3–5 hours. When the reaction is complete, 200 parts by weight of an ice-$H_2O$ mixture is added and the product filtered off on a Büchner funnel. Air is allowed to draw through the funnel for an additional 12 hours. Yield, crude DDT=94.5 g. (53% of theory) M. P. 95–98° C., 102–103° C., depending upon the extent of the water wash and time of drying. Upon recrystallization from ethanol, a product melting at 107–108° C. is obtained.

Analysis:

|  | Calculated | Found |
|---|---|---|
| Per Cent C | 47.45 | 47.51 |
| Per Cent H | 2.56 | 2.68 |
| Per Cent Cl | 49.99 | 49.53 |

Since recrystallization from ethanol results in the loss of approximately 35% of the product, to the mother liquor, the crude DDT may instead be further purified by washing with a 1% aqueous solution of a wetting agent (such as Aerosol OT or Tergitol 4 to 7).

By steam distilling the oily layer of the filtrate, mentioned above, an additional 10–15% of DDT may be recovered from the residue thus bringing the total yield to 63–68%.

This method may also be carried out at temperatures less than or greater than the 10–20° C. temperature range set forth in the presently preferred method. The process may also be conducted in the presence of inert solvents such as carbon tetrachloride, chlorobenzene, etc. For example, temperatures varying between —5° C. and 39° C. yielded the following results:

| Solvent | Temperature, °C. | Reaction Time, Hr. | Yield, Per Cent |
|---|---|---|---|
| $CCl_4$ | —5 to 0 | 5 | 38.40 |
| None | 10 | 2 | 40.2 |
| Do | 10 | 6 | 57.5 |
| Do | 20 | 6 | 69.1 |
| Do | 30 | 6 | 74.0 |
| $CCl_4$ | 15–20 | 6 | 71.3 |
| None | 0 | 7 | 51.0 |
| Do | 20 | 7 | 74.5 |
| $C_6H_5Cl$ | 0 | 6 | 54.5 |
| Do | 10 | 6 | 63.5 |
| Do | 25 | 6 | 76.1 |

It is believed that this method may be conducted at any temperature from 0° C. or lower and 50° C. or higher, the higher temperature, however, being detrimental to the purity of the product.

The three following examples illustrate methods of making DDT similar to the method of Example 1, but wherein the chlorsulfonic acid may be replaced with fluosulfonic acid, and/or the chloral hydrate replaced with chloral alcoholate (hemi-ethylacetal) or the crude product obtained from the chlorination of ethanol.

EXAMPLE 2

*Use of fluosulfonic acid in preparation of DDT from chloral hydrate*

In a reaction vessel fitted with a stirrer, inlet tube, thermometer, and apparatus for absorption of the hydrogen fluoride by-product, was placed 83 parts by weight of chloral hydrate. With stirring, 50 parts of fluosulfonic acid was added slowly. Immediately following this addition, 113 parts chlorbenzene was run in and well dispersed in the reaction mixture. The reaction vessel was cooled externally, and the addition was made at such a rate that the temperature was held below 30° C. This required about ten minutes. Then an additional 60 parts of fluosulfonic acid (including a 10% overall excess) was added, and stirring was continued for six hours, while the temperature was maintained at 30° C. Cooling was necessary during the first hour of this period. Considerable precipitation had occurred, and this material was filtered off at the end of the reaction. After washing and drying the precipitate, there was obtained 117.5 parts crude DDT, M. P. 93–103° C. The filtrate from the reaction mixture was poured into water and the oily residue solidified upon cooling and had a M. P. of 81–88° C. It was added to the first precipitate. Total yield of crude DDT was 149 parts, or 84% of theoretical. Recrystallization of the product from ethyl alcohol gave pure DDT, M. P. 107–108° C., which gave no depression of M. P. upon admixture with a sample of authentic material.

EXAMPLE 3

*Use of chloral alcoholate in preparation of DDT*

Chlorobenzene (112.5 parts by weight) and 97 parts by weight of chloral alcoholate

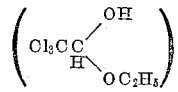

are placed in a suitable reaction vessel which is fitted with an efficient stirrer, a thermometer, and a reflux condenser. The mixture is warmed to about 45° C. and 116.5 parts of chlorosulfonic acid is added dropwise during a period of about 30 minutes while maintaining the temperature of the well-stirred reaction mass at about 45° C.

After a 6-hr. reaction period the solid DDT is filtered from the acid and washed twice with water and once with a 1% NaHCO₃ solution. A yield of dry solid product amounting to about 104 parts, or 59% of the theoretical, is obtained of product melting at 85–96° C., and a chlorine content of 49.65% (theory for DDT 50.0%).

The acid filtrate is poured on crushed ice and the heavy oil which separates is steam distilled. A total of about 2 parts of unreacted chlorobenzene is recovered. The nonvolatile residue amounts to about 38 parts, giving a yield based on total crude product of 79.5%.

EXAMPLE 4

*Use of fluosulfonic acid and chloral alcoholate in preparation of DDT*

A solution of 96 parts of chloral hemi-ethylacetal in 113 parts of chlorobenzene was poured into a suitable reaction vessel fitted with a mercury-seal stirrer, dropping funnel, thermometer, and apparatus for absorption of hydrogen fluoride. From the dropping funnel, 110 parts of fluosulfonic acid was added slowly with stirring and external cooling to keep the reaction temperature below 30° C. Then stirring at 30° C. was continued for 6 hours. The precipitate was filtered off, washed, and dried; melting point 95–99° C. The filtrate was poured into water and the oily layer steam distilled to remove unreacted chlorobenzene. The residue (M. P. 81–88° C.) was combined with the first precipitate. Crystallization of this crude DDT from ethyl alcohol gave a product melting at 107–108° C. This gave no depression in M. P. when mixed with an authentic sample of pure DDT.

In the preparation of DDT by the above methods of Examples 3 and 4 an improved yield (based on the chloral alcoholate) may be obtained by using a slight excess of chlorobenzene. The reaction rate may also be increased by carrying out the process at a higher temperature; however, at temperatures above about 65° C. appreciable amounts of sulfur-containing by-products are formed. The reactions may also be carried out at temperatures lower those given in the examples.

The invention may be employed to produce analogs of DDT as illustrated by the following examples:

EXAMPLE 5

*Use of chloral alcoholate in preparation of the benzene analog of DDT*

Chloral alcoholate (48 parts) was melted and diluted with 39 parts of benzene. To the stirred mixture there was added 58 parts of chlorosulfonic acid while the temperature of the mixture was held at 15–25° C. After a reaction period of six hours the mixture was treated with 250 parts of ice water.

An oily product separated from which volatile impurities were removed by steam distillation. After recrystallization from 95% ethanol a product was obtained which melted at 62–63° C., and which showed no depression of the melting point when mixed with an authentic sample of 1,1-diphenyl 2,2,2-trichloroethane.

EXAMPLE 6

*Use of chloral alcoholate in preparation of bromine analog of DDT*

To a well-stirred mixture of 48 parts of chloral alcoholate and 79 parts of bromobenzene, there was added slowly 58 parts of chlorosulfonic acid at a reaction temperature of 15–25° C. After a reaction period of 6 hours the mixture was treated with ice water (250 parts). An insoluble oil separated which was steam distilled and 21 g. of unreacted bromobenzene recovered. There remained 68 parts of a solid, non-volatile residue. A portion of this material was twice crystallized from ethyl alcohol giving a product which melted sharply at 140–141° C. A mixed M. P. with an authentic sample of 2,2-bis(p-bromophenyl)-1,1,1-trichloroethane showed no depression. A yield of 62% of theoretical was obtained.

EXAMPLE 7

*Use of fluosulfonic acid as catalyst in preparation of diphenyltrichlorethane from chloral hydrate*

The benzene analog of DDT was prepared by substituting 78 grams of benzene for the chlorobenzene as used in Example 2 above. After the reaction had been run for 4 hours at 30° C., the mass had almost completely solidified. It was broken up in ice water, washed thoroughly, filtered, and dried. The product (140 grams) melted at 57–60° C. Recrystallization from ethyl alcohol raised the M. P. to 61–62° C. Mixture with an authentic sample of diphenyltrichlorethane gave no depression in melting points.

EXAMPLE 8

*Use of fluosulfonic acid as catalyst in preparation of di-p-bromphenyltrichlorethane from chloral hydrate*

A bromine-containing analog of DDT was prepared by substituting 157 grams of brombenzene for the chlorobenzene in the procedure substantially that described in Example 2. After the reaction was held at 30° for 6 hours the mixture was filtered, and the precipitate washed and dried. There was obtained 95 parts of the crude product, M. P. 130–138° C. Recrystallization from ethyl alcohol raised the M. P. to 140–141° C. Mixture with an authentic sample of di-p-bromphenyltrichlorethane gave no depression in the melting point.

The advantages of this invention are not confined to completely eliminating the use of sulfuric acid, and it is possible through this invention to effect the condensation between chloralhydrate and chlorobenzene by employing a mixture of a halosulfonic acid and sulfuric acid or a halosulfonic and fuming sulfuric acid (oleum) as illustrated by the following example:

EXAMPLE 9

82.7 parts by weight of chloralhydrate is placed in a suitable reactor equipped with stirrer, thermometer, gas exit tube, and dropping funnel. 58.3 parts by weight of chlorsulfonic acid is added with stirring at such a rate that the temperature of the reaction mixture does not exceed 10° C. When all the chloralhydrate crystals have dissolved and the evolution of HCl gas has virtually ceased, 112.5 parts by weight of chlorbenzene is added with stirring to the reaction mixture at a rate such that the temperature does not exceed 20° C. From the dropping funnel, 143.0 parts by weight of 28% oleum ($H_2SO_4.SO_3$) is added dropwise with vigorous stirring over a period of 10–30 minutes. Stirring is continued from 2–6 hours at 20° C. after the addition of the oleum is complete. The product is washed with water, filtered, and dried. Yield DDT=50–60% of theory.

Although from the cost standpoint, it is now preferred to use chloralhydrate instead of anhydrous chloral, through the use of a halosulfonic acid, this invention also lends itself to the condensation of anhydrous chloral ($CCl_3CHO$) with chlorbenzene. This reaction, also requires the metathetical quantity of the halosulfonic acid, being however, only one-half that required for an equivalent quantity of chloral hydrate.

The following example illustrates the use of anyhdrous chloral:

EXAMPLE 10

73.7 parts by weight of anhydrous chloral is mixed with 112.5 parts by weight of chlorbenzene at 10° C. in a suitable reaction vessel equipped with thermometer, stirrer, gas exit tube, and dropping funnel. From the dropping funnel 58.3 parts by weight of chlorsulfonic acid is added dropwise over a period of 30 minutes keeping the temperature at 10–20° C. After addition of the chlorsulfonic acid is complete, stirring is allowed to continue for an additional 5½ hours at 10–20° C. The product is washed 3 times with water, filtered, dried, and weighed. Yield DDT=50–60% of theory.

The invention appears to have wide application in the condensation of aromatic hydrocarbons with many aliphatic alcohols and many aldehydes. The condensation reactions may, in certain instances, be advantageously carried out in the presence of an inert solvent, such as carbon tetrachloride. Experience has shown that secondary and tertiary alcohols are, as a class, considerably more susceptible to our new type of condensation reaction employing a halosulfonic acid, than are the primary alcohols. The following table outlines a number of condensation reactions in addition to the examples described in detail above.

TABLE

*Condensations by use of a halosulfonic acid*

| Example No. | Alcohol or Aldehyde Used | Aryl Compound Used | Product Obtained | Analytical Data On Product |
|---|---|---|---|---|
| 11 | $CCl_3CH(OH)_2$ | Benzene | $CCl_3C(H)(C_6H_5)(C_6H_5)$ | M. P., 61–62° C. Per cent C found, 59.0; Per cent C calc., 58.9; Per cent H found, 3.9; Per cent H calc., 4.0; Per cent Cl found, 37.2; Per cent Cl calc., 37.3 |
| 12 | $CCl_3CH(OH)_2$ | Toluene | $CCl_3C(H)(C_6H_4CH_3)(C_6H_4CH_3)$ | M. P., 74–76° C. Per cent found C, 61.2; Per cent C calc., 61.3; Per cent H found, 4.8; Per cent H calc., 4.8; Per cent Cl found, 34.8; Per cent Cl calc., 33.9 |
| 13 | do | Brombenzene | $CCl_3C(H)(C_6H_4Br)(C_6H_4Br)$ | M. P., 138–139° C. Per cent C found, 38.2; Per cent C calc., 37.9; Per cent H found, 2.2; Per cent H calc., 2.1; Per cent Cl found, 22.8; Per cent Cl calc., 24.0; Per cent Br found, 35.99; Per cent Br calc., 36.0 |

TABLE—Continued

Condensations by use of a halosulfonic acid—Continued

| Example No. | Alcohol or Aldehyde Used | Aryl Compound Used | Product Obtained | Analytical Data On Product |
|---|---|---|---|---|
| 14 | ....do.... | Br–C₆H₅ | BrCCl₃CH(C₆H₄Br)(C₆H₃Br₂) | Heavy oil (not analyzed). |
| 15 | ....do.... | o-Cl₂C₆H₄ | CCl₃CH(C₆H₃Cl₂)(C₆H₃Cl₂) | Do. |
| 16 | ....do.... | F–C₆H₅ | CCl₃CH(C₆H₄F)(C₆H₄F) | M. P., 40–42° C.<br>Per cent C found, 52.5<br>Per cent C calc., 52.3<br>Per cent H found, 2.9<br>Per cent H calc., 2.8<br>Per cent Cl found, 32.9<br>Per cent Cl calc., 33.1<br>Per cent F found, 11.7<br>Per cent F calc., 11.8 |
| 17 | $(CH_3)_3C{-}OH$ | Chlorbenzene | $(CH_3)_3C{-}C_6H_4Cl$ | Conversion of alcohol, 35%.<br>B. P., 214–216° C./760 mm.<br>Per cent Cl found, 21.0<br>Per cent Cl calc., 21.0<br>$N_{20}^D$ 1.509 |
| 18 | $(CH_3)_2CHOH$ | Benzene | (a) $(CH_3)_2CH{-}C_6H_5$<br><br>Isomeric Mixture<br>(b) $(CH_3)_2CH{-}C_6H_4{-}CH(CH_3)_2$ | (a) Conversion of alcohol, 40%.<br>B. P. 150–152° C./760 mm.<br>$N_{20}^D$ 1.491<br><br>(b) Conversion of alcohol, 18–20%. |
| 19 | C₆H₁₁CH₂OH | Benzene | C₆H₁₁CH₂C₆H₅ | Conversion of alcohol, 18–20%.<br>M. P. 25–26° C. |
| 20 | $(CH_3)_3C{-}OH$ | Benzene | (a) $(CH_3)_3C{-}C_6H_5$<br><br>(b) $(CH_3)_3C{-}C_6H_4{-}C(CH_3)_3$ | (a) Conversion of alcohol, 25%.<br>B. P., 169° C./760 mm.<br>$N_{20}^D$ 1.492<br><br>(b) Conversion of alcohol, 30%.<br>M. P., 76° C.<br>Per cent C found, 89.1<br>Per cent C calc., 88.4<br>Per cent H found, 10.9<br>Per cent H calc., 11.6 |
| 21 | $(CH_3)_2CHOH$ | Toluene | (a) $(CH_3)_2CH{-}C_6H_4{-}CH_3$<br><br>Isomeric Mixture<br>(b) $(CH_3)_2CH{-}C_6H_3(CH_3){-}CH(CH_3)_2$ | (a) Conversion of alcohol, 43%.<br>B. P., 175–178° C./760 mm.<br>$N_{20}^D$ 1.493<br><br>(b) Conversion of alcohol, 14%. |

TABLE—Continued

*Condensations by use of a halosulfonic acid*—Continued

| Example No. | Alcohol or Aldehyde Used | Aryl Compound Used | Product Obtained | Analytical Data On Product |
|---|---|---|---|---|
| 22 | ⌬–CH₂OH | Toluene | (a) ⌬–CH₂–⌬–CH₃<br>Isomeric Mixture<br>(b) ⌬–CH₂–⌬(–CH₃)(–CH₂–⌬) | (a) Conversion of alcohol, 28%.<br>B. P. 276–281° C./760 mm.<br>N₂₀D 1.572 |
| 23 | CBr₃CHO | Br–⌬ | CBr₃–CH(–⌬–Br)(–⌬–Br) | M. P., 168–169° C.<br>Per cent C found, 29.3<br>Per cent C calc., 29.2<br>Per cent H found, 1.7<br>Per cent H calc., 1.6<br>Per cent Br found, 68.1<br>Per cent Br calc., 69.3 |

Since certain further changes and modifications may be made in the foregoing processes and procedures, and different embodiments of the invention will suggest themselves to those skilled in the art, it is intended that all matter described above will be taken as illustrative and not in a limiting sense.

We claim:

1. The process for making 2,2-bis aryl 1,1,1,-trihaloethanes which comprises condensing at a temperature below 50° C. 2 moles of an aromatic compound selected from the group consisting of benzene, toluene, and halobenzenes containing at least one replaceable hydrogen atom, with one mole of an aldehyde compound of the group consisting of chloral, chloral hydrate, chloral alcoholate and bromal in the presence of at least a methathetical amount of fluosulphonic acid.

2. The process of claim 1 wherein the aromatic compound is fluobenzene.

3. The process of claim 1 wherein the aromatic compound is bromobenzene.

4. The process of claim 1 wherein the aromatic compound is benzene.

5. The process of claim 1 wherein the aromatic compound is chlorobenzene.

6. The process of claim 1 wherein the aldehydic compound is chloral hydrate.

7. The process of claim 1 wherein the aldehydic compound is chloral alcoholate.

8. The process of claim 1 wherein the aldehydic compound is anhydrous chloral.

9. The process of claim 1 wherein the aldehydic compound is bromal.

10. The method of making 2,2-bis (p-chlorophenyl) 1,1,1-trichloroethane, which comprises reacting, at a temperature below 30° C., one mol of chloral with approximately two mols of chlorobenzene in the presence of at least one mol of fluosulphonic acid.

11. The method of making 2,2-bis (p-chlorphenyl) 1,1,1-trichloroethane, which comprises, adding about 1 part by weight of fluosulfonic acid to about 1.66 parts by weight of chloral hydrate, adding about 2.26 parts by weight of chlorbenzene to the mixture while maintaining the reaction temperature below about 30° C., and adding about 1.2 parts by weight of fluosulfonic acid to the reaction mass while maintaining the reaction temperature at about 30° C.

12. The method of making 2,2-diphenyl 1,1,1-trichloroethane, which comprises, adding about 1 part by weight of fluosulfonic acid to about 1.66 parts by weight of chloral hydrate, adding about 1.56 parts by weight of benzene to the mixture while maintaining the reaction temperature below about 30° C., and adding about 1.2 parts by weight of fluosulfonic acid to the reaction mass while maintaining the reaction temperature at about 30° C.

13. The method of making 2,2-bis (p-bromophenyl) 1,1,1-trichloroethane, which comprises, adding about 1 part by weight of fluosulfonic acid to about 1.66 parts by weight of chloral hydrate, adding about 3.14 parts by weight of bromobenzene to the mixture while maintaining the reaction temperature below about 30° C., and adding about 1.2 parts by weight of fluosulfonic acid to the reaction mass while maintaining the reaction temperature at about 30° C.

14. The method of making 2,2-bis (p-chlorphenyl) 1,1,1-trichloroethane, which comprises, forming a mixture of about 1 part by weight of chloral alcoholate and about 1.18 parts by weight of chlorbenzene, adding about 1.17 parts by weight of fluosulfonic acid to the mixture while keeping the reaction temperature not in excess of 30° C.

WALTER H. C. RUEGGEBERG.
WILLARD E. CATLIN.
WALTER A. COOK.

REFERENCES CITED

The following references are of record in the file of this patent:

UNITED STATES PATENTS

| Number | Name | Date |
|---|---|---|
| 2,259,723 | Ballard et al. | Oct. 21, 1941 |
| 2,349,211 | Tulleners | May 16, 1944 |
| 2,500,961 | Rueggeberg et al. | Mar. 21, 1950 |